US006898869B2

(12) United States Patent  
Hüttlin (10) Patent No.: US 6,898,869 B2  
(45) Date of Patent: May 31, 2005

(54) DEVICE FOR TREATING PARTICULATE MATERIAL

(76) Inventor: Herbert Hüttlin, Rümminger Strasse 15, 79539 Lörrach (DE)

( * ) Notice: Subject to any disclaimer, the term of this patent is extended or adjusted under 35 U.S.C. 154(b) by 0 days.

(21) Appl. No.: 10/733,732

(22) Filed: Dec. 11, 2003

(65) Prior Publication Data

US 2005/0034322 A1     Feb. 17, 2005

Related U.S. Application Data

(63) Continuation of application No. PCT/EP02/06024, filed on Jun. 1, 2002.

(30) Foreign Application Priority Data

Jun. 12, 2001   (DE) .............................. 101 29 166

(51) Int. Cl.[7] ............................................. F26B 17/00
(52) U.S. Cl. ............................. 34/585; 34/588; 34/169
(58) Field of Search .......................... 34/582, 585, 588, 34/168, 169; 432/15, 58

(56) References Cited

U.S. PATENT DOCUMENTS

| 4,000,563 | A | | 1/1977 | Cubitt et al. ................... 34/10 |
|---|---|---|---|---|
| 4,360,976 | A | * | 11/1982 | Meckel et al. ................. 34/428 |
| 5,282,321 | A | * | 2/1994 | Huttlin ......................... 34/594 |
| 5,513,599 | A | * | 5/1996 | Nagato et al. .............. 122/4 D |
| 6,024,796 | A | * | 2/2000 | Salazar et al. .............. 118/326 |
| 6,367,165 | B1 | | 4/2002 | Huettlin ........................ 34/582 |
| 6,705,025 | B2 | * | 3/2004 | Werner et al. ................. 34/594 |

FOREIGN PATENT DOCUMENTS

| DE | 31 07 357 A1 | 9/1982 |
|---|---|---|
| DE | 203 826 | 11/1983 |
| DE | 37 05 353 A1 | 9/1987 |
| DE | 199 04 147 A1 | 8/2000 |
| EP | 1 025 899 A1 | 8/2000 |

* cited by examiner

Primary Examiner—Stephen Gravini  
(74) Attorney, Agent, or Firm—St. Onge Steward Johnston & Reens LLC (57) ABSTRACT

A device for treating particulate material has a process chamber. A bottom of the process chamber is composed of baffle plates which overlap one another and between which slots are formed. It is proposed to design the baffle plates as annular plates, so that circular slots are formed, and to place the annular plates in such a way that a radially outer, first flow, directed from outside to inside, of process air passing through, and a radially inner, second flow, directed from inside to outside, of process air passing through are formed, the two opposed flows meeting one another along a circular breaking-up zone and being deflected into a flow directed vertically upwards.

14 Claims, 6 Drawing Sheets

DEVICE FOR TREATING PARTICULATE MATERIAL

CROSS REFERENCE TO PENDING APPLICATION

This application is a continuation of pending International Patent Application PCT/EP02/06024 filed on Jun. 1, 2002 which designates the United States, and which claims priority of German Patent Application DE 101 29 166.3 filed on Jun. 12, 2001.

BACKGROUND OF THE INVENTION

The invention relates to a device for treating particulate material, having a process chamber for accommodating and for treating the material, a bottom of the process chamber being composed of baffle plates which overlap one another and between which slots are formed, via which slots process air can be introduced with an essentially horizontal component movement into the process chamber, the slots being arranged in such a way that two flows directed towards one another are produced, these flows meeting one another along a breaking-up zone and being deflected into a flow directed vertically upwards.

A device of this kind is disclosed by DE 199 04 147 A1.

Such devices serve to dry, granulate or coat a particulate material.

A gaseous medium—"process air"—is introduced into the process chamber via the bottom and enters the process chamber through the numerous slots between the overlapping baffle plates in an approximately horizontally directed manner.

In the device mentioned at the beginning, the slots of the circular bottom extend along secants, and the breaking-up zone is arranged along a diameter. In the region of the breaking-up zone along the diameter, the material is subjected to a vertical movement by the flow directed upwards. After a certain distance, the material divides along the diameter, falls back laterally into the approximately half-disc-shaped bottom regions and is then moved again in the direction of the centre diameter towards the breaking-up zone.

The aim in this technology is to treat the material as effectively as possible. Underlying this is the fact that the material is to be treated as uniformly as possible in the shortest possible time with the least possible expenditure of energy. To treat the material as uniformly as possible, controllable and definable geometries of the material movement are necessary.

It is therefore the object of the present invention to develop a device of the type mentioned at the beginning to the effect that the material can be treated effectively and as uniformly as possible.

SUMMARY OF THE INVENTION

According to the invention, the object is achieved in that the baffle plates are designed as annular plates, so that circular slots are formed, and in that the annular plates are placed in such a way that a radially outer, first flow, directed from outside to inside, of process air passing through and a radially inner, second flow, directed from inside to outside, of process air passing through are formed, the two opposed flows meeting one another along a circular breaking-up zone.

Due to this configuration, an outer annular push plane is formed above the bottom, via which push plane the material is moved from outside to inside in the direction of an annular breaking-up zone. In the process, the desired air cushion effect is maintained, and the material is moved in a protective manner and specifically in the direction of the breaking-up zone.

An inner circular push plane counters this outer annular push plane. The material is likewise moved there like an air cushion from inside to outside in the direction of the annular breaking-up zone. By the design of the breaking-up zone as a ring, a substantially longer breaking-up zone, in the case of a circular bottom of a certain diameter, is created than in the device of the type mentioned at the beginning, in which the breaking-up zone extends merely along a diameter.

A further important advantage consists in the type of material movement. After a certain vertical movement of the material, the height and intensity of which depends on the air quantity supplied and on its static pressure and also on the form, density and weight of the moving material, the material divides in the manner of a diffusion, one half of the moving material volume falling outwards and the other half falling inwards and the said halves finally flowing back to the circular breaking-up zone. Double flooding results over a cross section of such a device, it being possible for the movement of this double flooding to be configured in an exceedingly well-defined manner.

During the horizontal movement of the material particles towards the annular breaking-up zone, the material can already be subjected to a high drying rate before it encounters the breaking-up zone. Of course, such material always tends to stick; during the drying because the material is initially moist, and during the granulating or coating due to the granulating or coating liquid correspondingly sprayed onto the material.

As viewed radially outside and radially inside the circular breaking-up zone, encircling material movements which are geometrically clearly defined and controllable are therefore formed. This makes possible not only an effective but also an extremely uniform treatment of the material.

In a further configuration of the invention, the circular breaking-up zone extends along a circle halving the area of the bottom.

This measure has the advantage that the radially outer annular area is exactly the same size as the circular area located radially inside the circular breaking-up zone. The material quantity which is moved radially outside the circular breaking-up zone therefore runs over the same area as the radially inner moving material, i.e. both material quantities are acted upon with process air over a region of identical area and are thus accelerated, so that uniform conditions prevail on both sides of the circular breaking-up zone, a factor which further contributes to the uniformity of the treatment result.

In a further configuration of the invention, baffle elements are arranged between the annular plates, and these baffle elements impose a circumferential component movement on the process air flowing through between the annular plates.

This measure has the advantage that not only is the horizontally directed component imposed on the process air when passing through between the annular plates, but a certain circumferentially directed component can also be imposed on the process air at the same time due to the corresponding orientation of the baffle elements. As a result, it is then possible to not only move the material particles encircling on both sides of the breaking-up zone in respective radial planes, but to also impose a circumferential component on them, so that, for example, the outer ring of moving material particles also additionally rotates about the centre longitudinal axis of the bottom, a factor which contributes to the effectiveness of the treatment.

In a further configuration of the invention, the baffle elements at the same time function as spacers.

This measure has the advantage that, by simple design measures, both the superimposed annular plates are kept at a distance apart and the baffle effect can also be achieved.

In further configuration of the invention, baffle surfaces are arranged in the region of the breaking-up zone, these baffle surfaces directing the transition of the horizontal flows into the vertical flow.

This measure has the advantage that, in the case of material which is sensitive to impingement, the change of direction of the opposed horizontal directions into the direction rising vertically upwards is gently assisted in a mechanical manner.

In a further configuration of the invention, a slot is likewise arranged in the region of the peripheral circumference of the bottom, via which slot process air can be introduced into the process chamber in an inwardly directed manner.

This measure has the considerable advantage that no caking or sticking can occur in this critical marginal corner region, but rather that this critical region is always blown free by this peripheral slot. This likewise contributes to a uniform treatment result.

In a further configuration of the invention, at least one nozzle spraying approximately vertically upwards is arranged in the breaking-up zone.

This measure has the advantage that a treatment medium, for example a granulating liquid or a coating liquid, can be sprayed in a specific manner onto the material particles in the breaking-up zone.

In this case, different configurations of nozzles can be used, and the arrangement and the number of nozzles can be selected in accordance with the geometrical conditions.

In an advantageous configuration, the nozzle is designed as a slotted nozzle, the slotted openings of which extend along the breaking-up zone.

This measure has the advantage that the nozzle orifices are arranged exactly in the region of the breaking-up zone, that is to say the zone in which the opposed flows meet one another and are deflected vertically upwards.

In this case, the slotted nozzle can be configured in such a way that it sprays over the entire circumference of the breaking-up zone.

In a further configuration of the invention, a plurality of slotted nozzles is arranged in a distributed manner in the breaking-up zone.

This measure has the advantage that the device can thus be flexibly adapted to different types of material, since it is sufficient to spray the treatment medium onto the material at some locations in a circumferentially distributed manner around the annular breaking-up zone in particular if, as mentioned above, a circumferential component movement is imposed on the material anyway.

In a further configuration of the invention, the slotted nozzle has two orifices in the form of slotted openings.

This measure has the advantage that nozzles of simple construction are possible. This is because it has been found that it is sufficient to provide one orifice opening for the liquid and one orifice opening for the atomizing air in order to achieve a fine spray mist. Since the nozzle is of course arranged directly in the breaking-up zone, the opposed flows which have impinged on one another move upwards on both sides of the nozzle and thus move the material particles in a specific manner into the spray mist.

As a result, additional accompanying flows around the nozzle which were previously considered to be necessary and which were intended to rule out the possibility of sticking directly in the region of the nozzle orifices can be dispensed with. This sticking can therefore now no longer occur, since the opposed flows impinging on one another move upwards along the outside of the nozzle, which of course is arranged precisely in the breaking-up zone, and the constituents issuing from the nozzle lead away from the nozzle orifice.

This measure therefore has the considerable advantage that an extremely good spray behavior can be achieved with a simple nozzle construction, a factor which entails a good treatment result.

In a further configuration of the invention, the slotted openings of the slotted nozzle are defined by a plurality of plates held at a distance apart.

This measure has the advantage that the slotted nozzle is composed of components of simple design and is therefore also simple to clean.

In a further configuration of the invention, the plates are held at a distance apart via spacers and are held on one another by a holding device.

This measure has the advantage that the aforementioned advantage of the simple construction is improved further, and that, by releasing the holding device, the plates can be removed from one another and separated for cleaning purposes. During assembly, if other spray media are desired, other spacers may then also be used, so that the width of the orifice openings can then be varied.

In a further configuration of the invention, the slotted nozzle is designed as a module component which can be inserted from below into the bottom of the process chamber into the breaking-up zone.

This measure has the advantage that the nozzles can be inserted into the device and also removed from the latter in a simple manner, if need be even during a treatment process, if faults occur.

In a further configuration of the invention, the plates, bearing against one another, of the slotted nozzle are arched on the inflow side, as a result of which inflow passages are formed.

This measure has the advantage that the slotted nozzle together with the requisite feed passages is formed by extremely simple design measures.

It goes without saying that the features mentioned above and the features still to be explained below can be used not only in the respectively specified combination but also in other combinations or on their own without departing from the scope of the present invention.

BRIEF DESCRIPTION OF THE DRAWINGS

The invention is described and explained in more detail below with reference to a selected exemplary embodiment in connection with the attached drawings, in which.

DETAILED DESCRIPTION OF A PREFERRED EMBODIMENT

Figure 1:
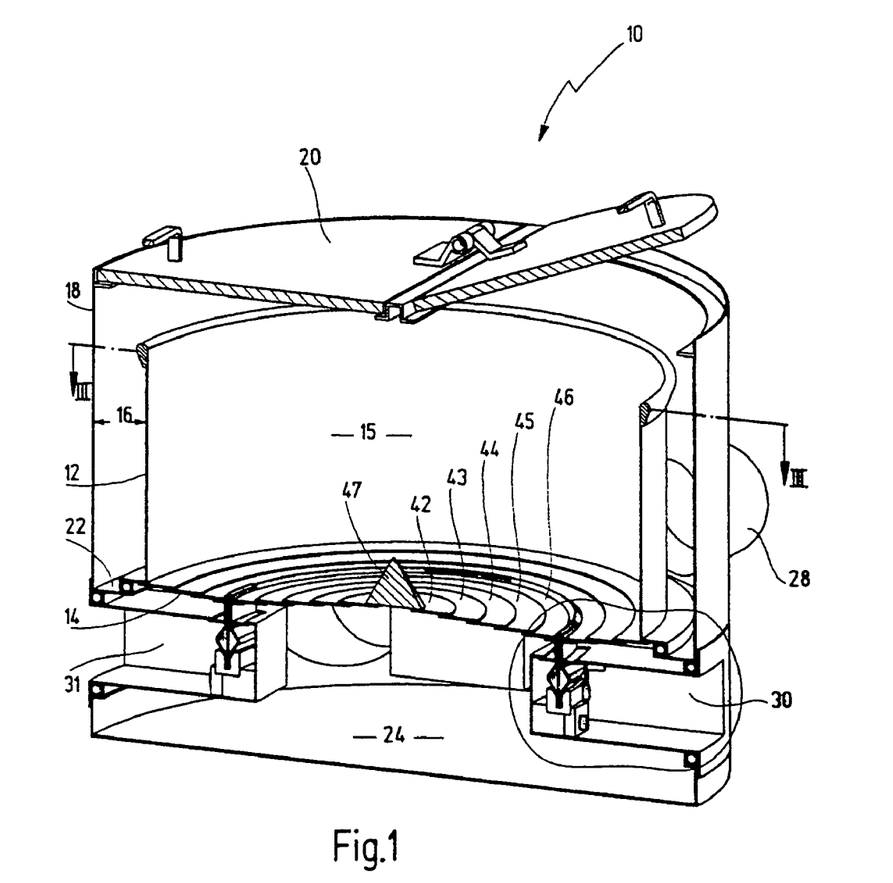
FIG. 1 shows a perspective representation of a device according to the invention in a section along a diameter of the circular device.
Figure 2:
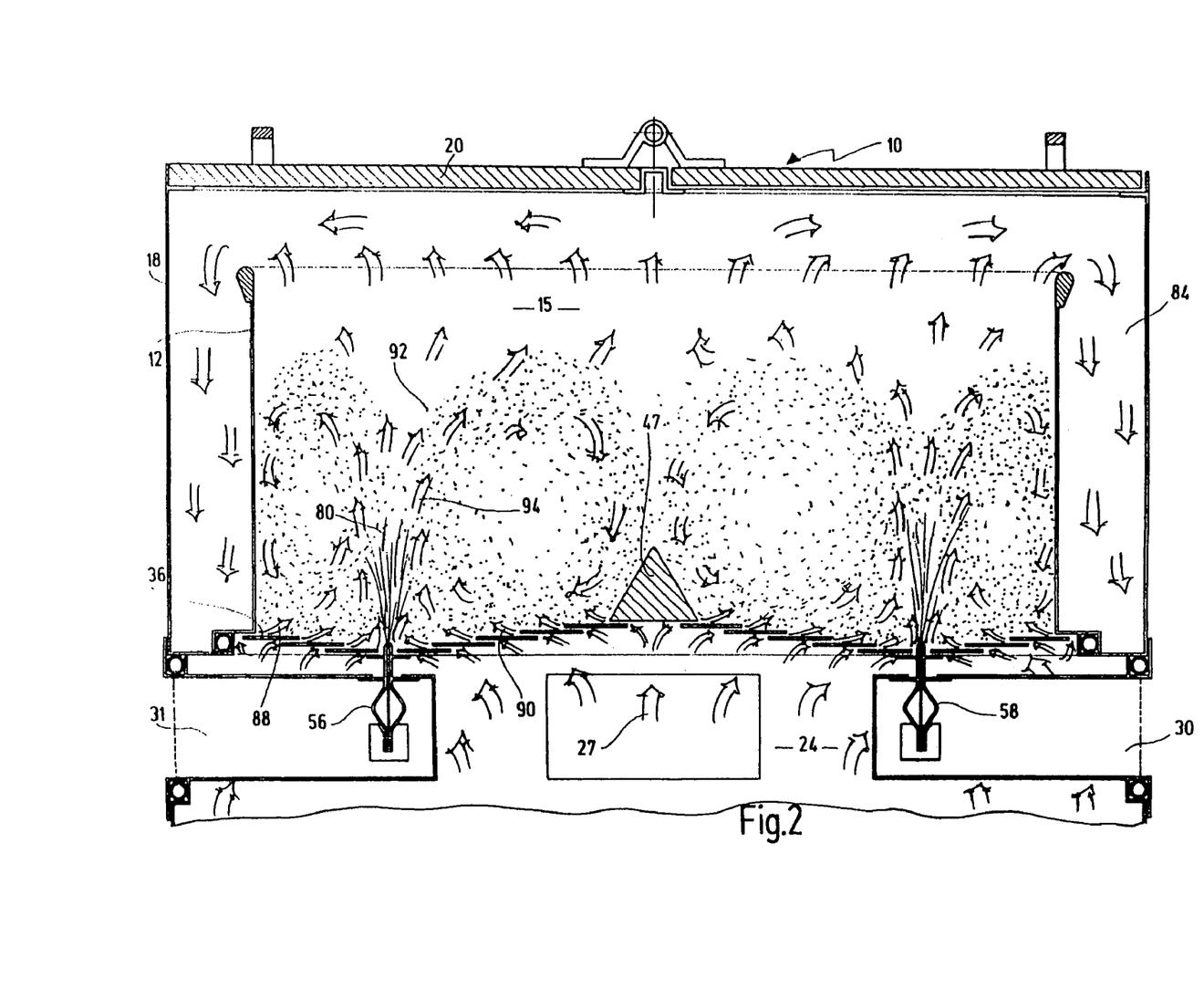
FIG. 2 shows a side view of the section of FIG. 1, the flow conditions of the process air and the movement conditions of the moving material being shown by flow arrows.

A device shown in the figures, in particular in FIGS. 1 and 2, is provided in its entirety with the reference numeral 10.

The device 10 has an upright cylindrical container 12 which is provided with a bottom 14. The interior space of the container 12 constitutes a process chamber 15.

The container 12 is surrounded at a distance from and concentrically by an outer wall 18.

The height of the outer wall 18 is somewhat larger than the height of the container 12, and the outer wall 18 is closed via a lid 20. A stepped annular flange 22 extends on the bottom side between container 12 and outer wall 18.

Arranged beneath the bottom 12 is an inflow chamber 24, via the inlet 26 of which process air 27 is introduced.

As will be described in more detail below, the process air 27 flows out of the inflow chamber 24 through the bottom 14 into the interior space of the container 12, that is to say into the process chamber 15. The process air 27 leaves the container 12 at the top end and enters the lateral annular chamber between container 12 and outer wall 18, flows downwards and flows out of the device again via an outlet 28 (see in particular FIG. 1 and FIG. 3).

Four cavities are recessed in the inflow chamber 24, in which case two diametrically opposite cavities 30 can be seen from the sectional representation of FIGS. 1 and 2. The cavities are designed as bulges, open towards the outside, in a side wall of the inflow chamber 24, i.e. the said cavities are accessible from the outside and they serve to accommodate nozzles 56 still to be described in more detail.

First of all, the more precise composition of the bottom 14 is to be described in more detail with reference to the figures. As can be seen in particular from FIGS. 1, 3 and 4, the bottom is composed of a first set of outer annular plates 32, 33 and 34.

As can be seen in particular from the detailed representation of FIG. 4, the outer annular plate 32 is the one with the largest diameter and it extends at a distance right below the upright wall of the container 12. As a result, a circumferential slot 36 is formed, see in particular FIG. 3, via which process air 27 can enter the process chamber 15 from the inflow chamber 24.

An annular plate 33 of smaller diameter is arranged below the annular plate 32, to be precise in such a way that the top annular plate 32 slightly overlaps this annular plate 33 lying underneath, as can be seen in particular from FIG. 4. This creates a further annular slot 37, through which process air 27 can enter in a first flow 88 directed radially from outside to inside.

A further annular plate 34 of still smaller diameter then lies under the annular plate 33, the annular plate 33 slightly overlapping the annular plate 34 lying underneath, so that a further annular slot 38 is then created as a result.

Figure 3:
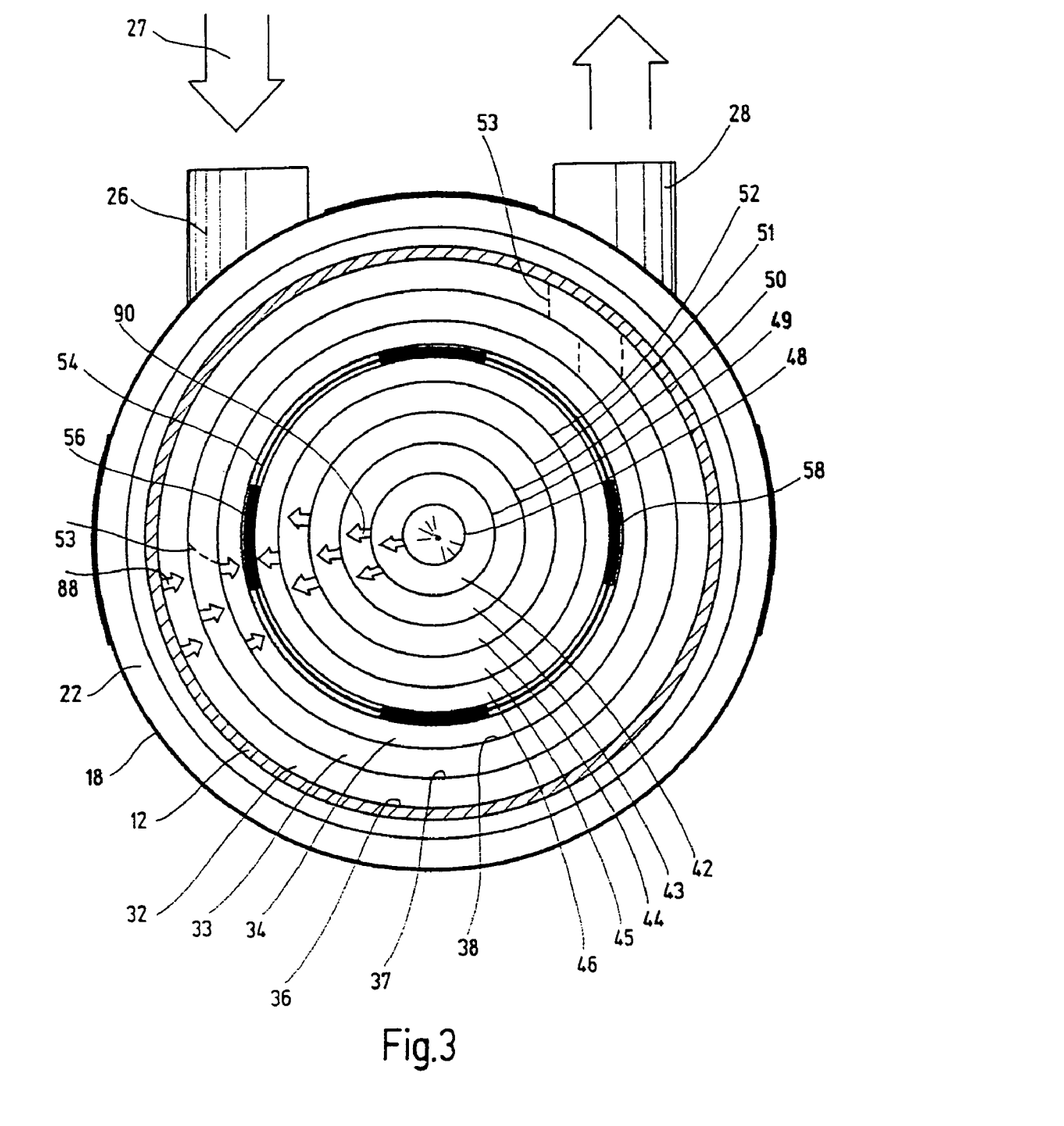
FIG. 3 shows a section along line III—III in FIG. 1, resulting in a plan view of the bottom.

A second set of five annular plates 42 to 46 forms an inner disc-shaped section of the bottom 14, as can be seen in particular from the plan view of FIG. 3. The arrangement, position and overlapping of these inner five annular plates 42 to 46 can be seen in particular from FIGS. 1, 2 and 7.

It can be seen from this that there is a central annular plate 42 of smallest diameter, the central annular opening of which is covered by a cone 47. An annular plate 43 of somewhat larger diameter is placed below the first annular plate 42, the annular plate 42 slightly overlapping the annular plate 43. As a result, an annular slot 48 is created between the annular plate 42 and the annular plate 43 (see in particular FIG. 3), through which the process air 27 can issue in a flow 90 directed from inside to outside. An annular plate 44 of larger diameter then accordingly lies below the annular plate 43, as a result of which a further slot 49 is created. This then continues with the annular plates 44, 45 and 46, as a result of which further slots 50, 51 and 52 are formed.

Figures 7, 8:
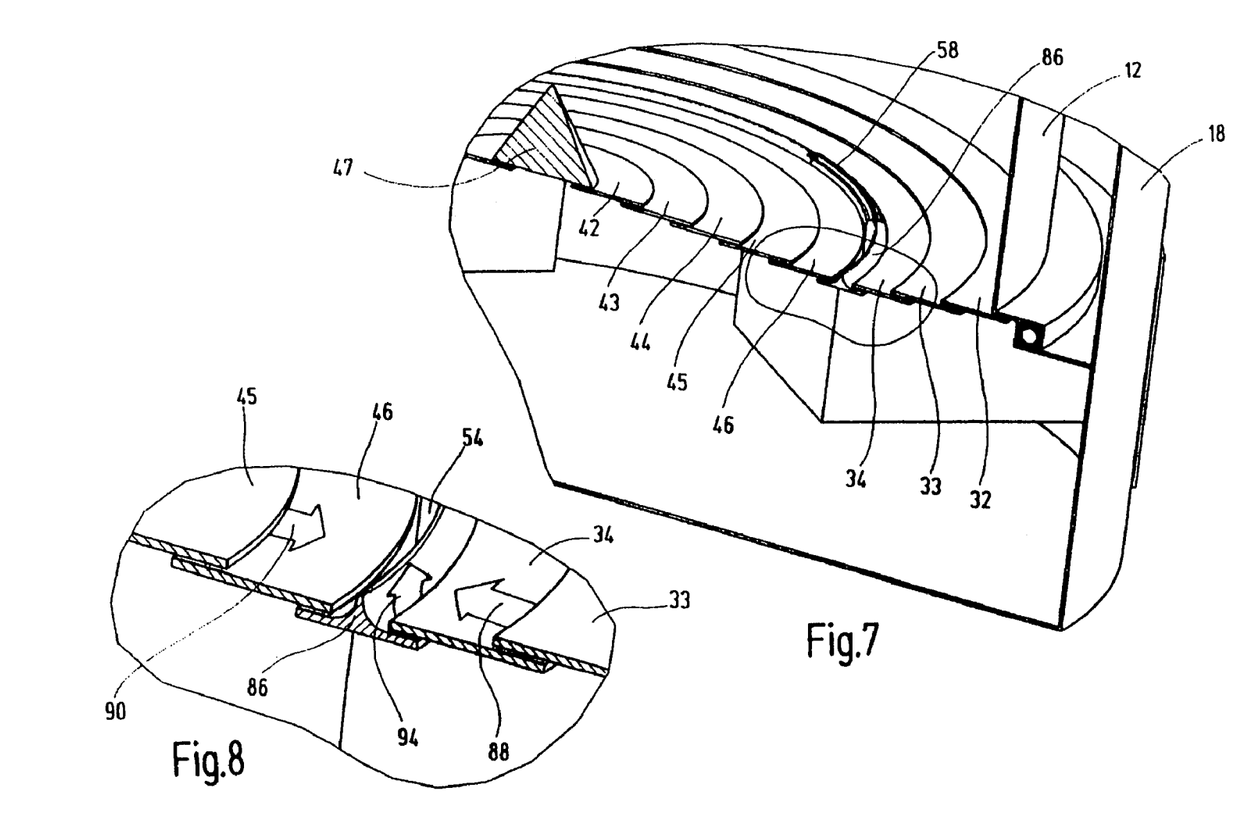
FIG. 7 shows a representation, corresponding to the sectional representation of FIG. 4, in the region of a baffle element.
FIG. 8 shows a greatly enlarged representation of the region encircled in FIG. 7.

It can be seen in particular from the detailed representations of FIGS. 7 and 8 that the radially innermost annular plate 34 of the outer set of annular plates comes to lie at the same level as and at a distance from the outermost annular plate 46 of the inner set of annular plates.

As can be seen in particular from the greatly enlarged representation of FIG. 8, the approximately horizontally running, first flow 88 produced by the outer annular plates 32 to 34 and directed from outside to inside and the second, approximately horizontally running flow 90 directed radially from inside to outside by the inner annular plates 42, 43, 44, 45 and 46 impinge on one another in this region, and the said flows 88 and 90 are deflected into a flow 94 directed vertically upwards.

The region in which these opposed flows 88 and 90 meet one another is a "breaking-up zone" 54. It can be seen in the representation of FIGS. 7 and 8 that guide surfaces 86 can be arranged in the region of this breaking-up zone 54, these guide surfaces 86 directing the transition of the opposed, approximately horizontally directed flows 88 and 90 into the flow 94 directed vertically upwards.

It can be seen in particular from the representations of FIGS. 1, 2, 4 and 5 that nozzles 56 may also be arranged in the region of the breaking-up zone 54.

Four nozzles uniformly distributed circumferentially are arranged in the exemplary embodiment shown and are all designed as slotted nozzles 58.

First of all the more detailed construction of such a slotted nozzle 58 is to be described below, this slotted nozzle 58 being constructed as a module component, as can be seen from FIG. 6. This module component can be fitted or inserted via the lateral cavities 30 and 31, respectively, to be precise in such a way that the corresponding slotted openings of the slotted nozzle 58 run along the breaking-up zone 54.

The slotted nozzle 58 is composed of a set of assembled plates 60, 61, 62 which are kept at a distance apart by spacers (not shown in any more detail here) and are connected to one another via a holding device 64, the said plates 60, 61, 62 being held together via tommy screws 65. The two outer plates 60 and 62 have two lateral flange plates 66 and 67 at a distance from the orifice opening of the nozzle, the lateral extension of these flange plates 66 and 67 being designed in such a way that the said flanges, when the nozzle is fitted as shown in FIG. 4, are overlapped by the annular plates 34 and 46, respectively. As a result, further slots 78 and 79 are formed, via which process air 27 can enter the process chamber 15, to be precise in such a way that, as can be seen in particular from FIG. 5, these flows meet one another in the region of the breaking-up zone 54 in accordance with the opposed flow principle and are deflected upwards into the single vertical flow.

Extending on both sides at a distance from and approximately parallel to the lateral flange plates 66 and 67 is an end plate 68 and 69 which serves to close an opening 70 in a wall 82 of the cavity 30 when the slotted nozzle 58 designed as a module part is fitted.

Figure 5:
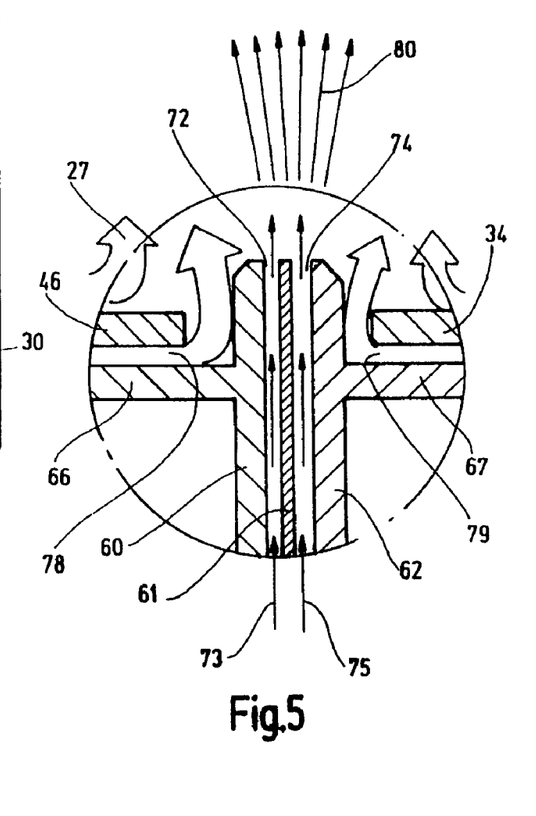
FIG. 5 shows a further greatly enlarged view of the region encircled in FIG. 4 in the region of a nozzle orifice.

It can be seen in particular from the representations of FIGS. 1 and 5 that two slotted openings 72 and 74 are formed in the slotted nozzle 58. A liquid 73 can be passed through one slotted opening, and atomizing air 75 can be passed through the other slotted opening, for which purpose corresponding connection pieces 76 and 77 (see FIG. 6) are provided.

This produces a fine spray mist 80 (see FIG. 5) on sprayed treatment medium which issues through the slotted nozzle 58 and, as will be described in more detail below in connection with FIG. 2, is applied to the material 92 swirled in the process chamber 15.

Figure 6:
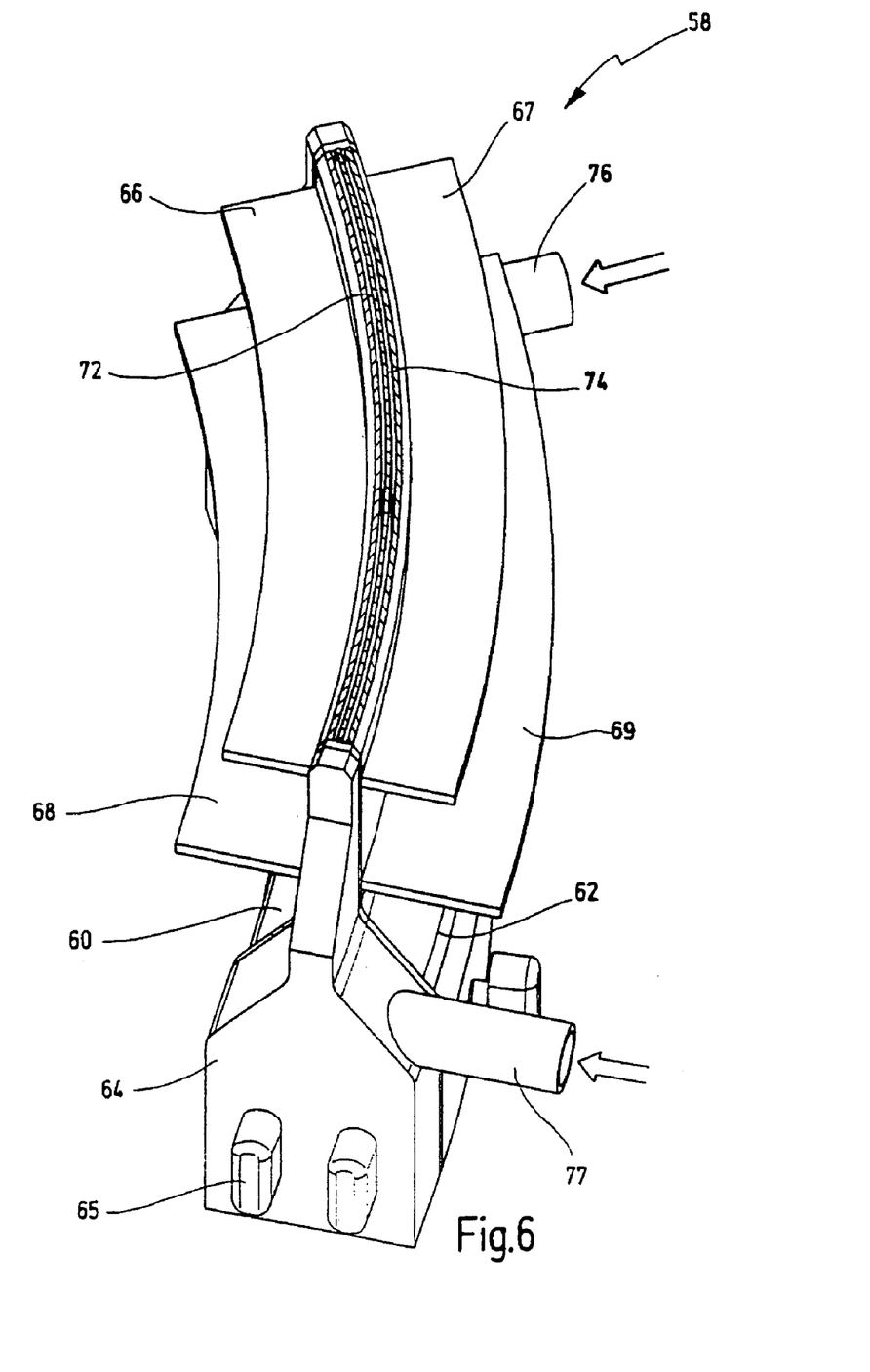
FIG. 6 shows a perspective representation of a circle-segment-shaped nozzle slotted nozzle as module component.

In FIG. 6, the slotted nozzle 58 is designed in such a way that its contour is adapted to the curvature of the circular breaking-up zone 54.

In very large devices, which may be several meters in diameter, the slotted nozzle 58, for production reasons, may also be of linear design and may be arranged in the corresponding opening between the innermost annular plate 34 of the outer set and the outer annular plate 46 of the inner set of annular plates. It can be seen from FIG. 4 that the outer plates 60 and 62 are bulged out, whereas the central plate 61 in between is continuously rectilinear, so that corresponding feed passages for feeding the liquid 73 and the spray air 75, respectively, are created.

Figure 4:
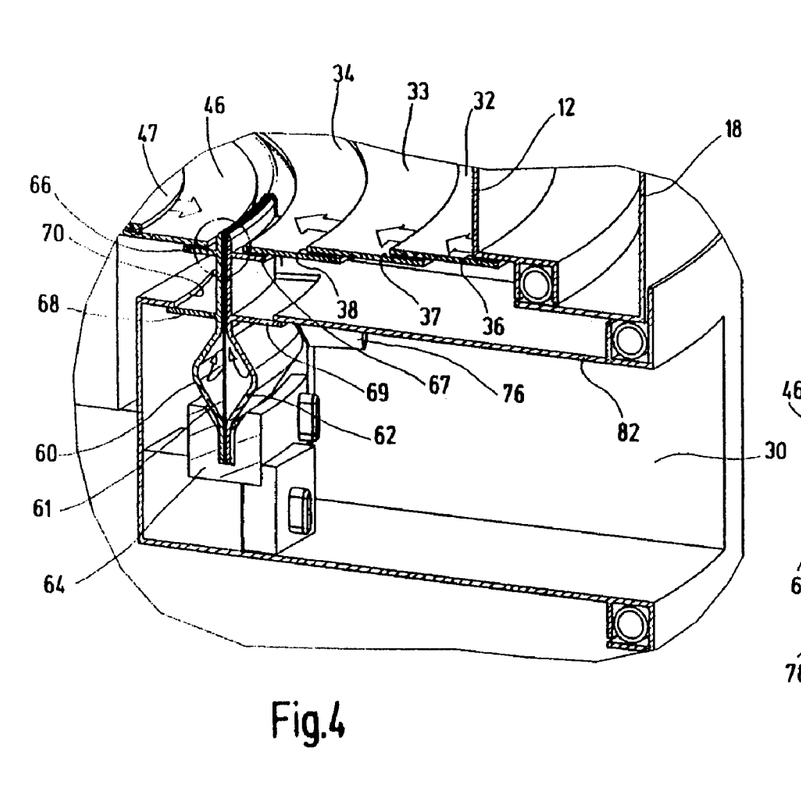
FIG. 4 shows a greatly enlarged representation of the region encircled with a line in FIG. 1.

As can be seen in particular from FIGS. 1 and 4, the slotted nozzle 58 designed as a module component can be fitted and removed in a simple manner without disturbing the actual operation in the interior of the process chamber 15.

For exchange, these slotted nozzles can be replaced, for example, by another nozzle type or, in order to clean the nozzle, can simply be removed laterally from the cavity 30 or 31, respectively.

By releasing the tommy screw 65, the holding device can be removed, and the plates 60, 61, 62 can be removed from one another and then cleaned.

The construction of these modular-like slotted nozzles 58 additionally contributes to an excellent treatment result in the device 10.

The flow conditions in the device according to the invention 10 during operation can be seen from FIG. 2.

A particulate material 92, for example a fine powder, which is to be granulated, a granulate which is to be coated, or pellets which are to be coated, is accommodated in the process chamber 15.

Owing to the fact that the sets of annular plates 32 to 34 and 42 to 46 extend approximately horizontally and overlap one another, there is no risk of fine-particle material 92 also falling through the bottom 14 after the filling.

The process air 27 fed via the inflow chamber 24 flows in through the outer set of annular plates 32, 33 and 34 in such a way that a first, approximately horizontal flow 88 directed from outside to inside is produced. In the process, the outer circumferential slot 36 in particular ensures that no caking and sticking occur in this critical end region.

The inner set of annular plates 42 to 46 provides for a likewise approximately horizontal, second flow 90 directed from inside to outside.

It can be seen in particular from the plan view of FIG. 3 that the diameter of the breaking-up zone 54 is selected in such a way that this diameter extends along the circle halving the area of the bottom 14. The diameter of this circle halving the area is within a ratio of outside diameter to inner area diameter of about 1.41.

In other words, the material 92 is moved over an identical area on both sides of the annular breaking-up zone 54, so that correspondingly uniform conditions are present.

By the provision of spacers of appropriately curved design between the annular plates, as indicated in FIG. 3 by the reference numeral 53, these spacers can at the same time assume the function of a baffle element 53, i.e. a circumferential component can be additionally imposed on the process air 27.

Returning to the representation of FIG. 2, it can now be seen that the two opposed flows 88 and 90 meet one another in the region of the breaking-up zone 54 and are deflected into a vertical flow 94 directed upwards. In this region, an appropriate medium, for example a granulating liquid or a coating liquid, is applied to the material particles by the spray cone 80 of the slotted nozzle 58.

The upwardly directed vertical flow of the material particles 92 divides after a certain time into a flow falling inside the breaking-up zone 54 and a flow falling outside the breaking-up zone 54. The material particles 92 directed outwards are deflected downwards via the wall of the container 12, then encounter the corresponding region of the bottom 14 again and are accelerated again by the process air 27 and are moved like an air cushion towards the breaking-up zone 54.

The material particles deflected inwards have a greater distance at their disposal and then fall due to the force of gravity and are deflected laterally outwards again by the central cone 47.

There, the said material particles are accelerated again by the process air 27 passing through the inner set of annular plates 42 to 46 and are returned again like an air cushion to the breaking-up zone 54.

Viewed overall, an outer torus of encircling material particles 92 and an inner torus of encircling material particles 92 are therefore produced in the process chamber 15, as is shown by the flow arrows in FIG. 2.

The process air 27 which has left the fluidized bed of swirled material 92 flows in the direction of the lid 20, is deflected into the annular space between the container 12 and outer wall 18, is directed downwards and is discharged again from the container 12 via the outlet 28, processed accordingly and then fed again to the container 12 via the inlet 26.

What is claimed is:

1. Device for treating particulate material, having
   a process chamber for accommodating and for treating a material,
   said process chamber having a bottom being composed of baffle plates which overlap one another and between which baffle plates slots are formed, via which slots a process air can be introduced with an essentially horizontal component movement into said process chamber,
   said slots being arranged in such a way that two flows directed towards one another are produced, these two flows meeting one another along a breaking-up zone and being deflected into a flow directed vertically upwards, wherein said baffle plates are designed as annular plates, so that circular slots are formed, and said annular plates are placed in such a way that a radially outer, first flow, directed from outside to inside, of said process air passing through and a radially inner, second flow, directed from inside to outside, of process air passing through are formed, said two opposed flows meeting one another along a circular breaking-up zone.

2. Device of claim 1, wherein said circular breaking-up zone extends along a circle halving an area of said bottom.

3. Device of claim 1, wherein baffle elements are arranged between said annular plates, said baffle elements impose a circumferential component movement on said process air flowing through between said annular plates.

4. Device of claim 3, wherein said baffle elements at the same time function as spacers.

5. Device of claim 1, wherein guide surfaces are arranged in a region of said breaking-up zone, these guide surfaces directing a transition of horizontal flows into said vertical flow.

6. Device of claim 1, wherein a slot is likewise arranged in a peripheral circumferential region of said bottom, via which slot process air can be introduced into said process chamber in an inwardly directed manner.

7. Device of claim 1, wherein at least one nozzle spraying vertically upwards is arranged in said breaking-up zone.

8. Device of claim 7, wherein said nozzle is designed as a slotted nozzle, having slotted openings which extend along said breaking-up zone.

9. Device of claim 8, wherein a plurality of slotted nozzles is arranged in a distributed manner in said breaking-up zone.

10. Device of claim 9, wherein each of said slotted nozzles has two orifices in the form of slotted openings.

11. Device of claim 10, wherein said slotted openings of said slotted nozzle are defined by a plurality of plates held at a distance apart.

12. Device of claim 11, wherein said plates are held at a distance apart via spacers and are held on one another by a holding device.

13. Device of claim 12, wherein said plates, bearing against one another, of said slotted nozzle are arched on an inflow side and thereby forming inflow passages.

14. Device of claim 1, wherein at least one slotted nozzle spraying vertically upwards is arranged in said breaking-up zone, said slotted nozzle being designed as a module component which can be inserted from below into said bottom of said process chamber within said breaking-up zone.

* * * * *